(12) United States Patent
Minagawa et al.

(10) Patent No.: US 11,507,078 B2
(45) Date of Patent: Nov. 22, 2022

(54) WORK SYSTEM, WORK MACHINE, AND CONTROL METHOD

(71) Applicant: Komatsu Ltd., Tokyo (JP)

(72) Inventors: Masanori Minagawa, Tokyo (JP); Yasuhiro Ohyama, Tokyo (JP); Qi Ding, Tokyo (JP)

(73) Assignee: Komatsu Ltd., Tokyo (JP)

( * ) Notice: Subject to any disclaimer, the term of this patent is extended or adjusted under 35 U.S.C. 154(b) by 214 days.

(21) Appl. No.: 16/613,820

(22) PCT Filed: Oct. 3, 2018

(86) PCT No.: PCT/JP2018/037083
§ 371 (c)(1),
(2) Date: Nov. 15, 2019

(87) PCT Pub. No.: WO2019/069996
PCT Pub. Date: Apr. 11, 2019

(65) Prior Publication Data
US 2020/0174465 A1 Jun. 4, 2020

(30) Foreign Application Priority Data
Oct. 4, 2017 (JP) .............................. JP2017-194605

(51) Int. Cl.
| | | |
|---|---|---|
| G05D 1/00 | (2006.01) |
| E02F 9/26 | (2006.01) |
| G05D 1/02 | (2020.01) |
| B60W 60/00 | (2020.01) |
| E02F 3/30 | (2006.01) |

(52) U.S. Cl.
CPC ............ *G05D 1/0011* (2013.01); *E02F 9/267* (2013.01); *G05D 1/0212* (2013.01); *B60W 60/001* (2020.02); *E02F 3/308* (2013.01); *G05D 2201/0202* (2013.01)

(58) Field of Classification Search
CPC .. G05D 1/0011; G05D 1/0038; G05D 1/0055; G05D 1/0212; G05D 1/0282; G05D 2201/0202; G05D 2201/021; E02F 3/308; E02F 9/205; E02F 9/2054; E02F 9/24; E02F 9/267; E02F 9/268; B60W 60/001
See application file for complete search history.

(56) References Cited

U.S. PATENT DOCUMENTS

| | | | |
|---|---|---|---|
| 6,226,572 B1 | 5/2001 | Tojima et al. | |
| 6,728,619 B2 * | 4/2004 | Adachi | G08C 17/02 701/50 |
| 8,155,823 B2 * | 4/2012 | Itoh | B60W 50/04 701/31.7 |

(Continued)

FOREIGN PATENT DOCUMENTS

| | | |
|---|---|---|
| CN | 103437396 A | 12/2013 |
| JP | 10-222227 A | 8/1998 |

(Continued)

*Primary Examiner* — Tyler J Lee
(74) *Attorney, Agent, or Firm* — Locke Lord LLP (57) ABSTRACT

A work system includes an operation device that transmits an operation signal, a work machine that operates on the basis of the operation signal, and a transport vehicle that outputs a traveling control signal in a case where a fault in communication between the operation device and the work machine occurs.

11 Claims, 6 Drawing Sheets

(56) References Cited

U.S. PATENT DOCUMENTS

| | | | |
|---|---|---|---|
| 10,019,007 B2 * | 7/2018 | Sakai | G05D 1/0212 |
| 2002/0165645 A1 | 11/2002 | Kageyama | |
| 2014/0222247 A1 | 8/2014 | Friend et al. | |
| 2015/0032293 A1 | 1/2015 | O'Neill et al. | |
| 2017/0293295 A1 | 10/2017 | Tani | |

FOREIGN PATENT DOCUMENTS

| | | |
|---|---|---|
| JP | 2000-315112 A | 11/2000 |
| JP | 2000-339029 A | 12/2000 |
| JP | 2015-222502 A | 12/2015 |
| JP | 2016-071585 A | 5/2016 |
| WO | 2015/087382 A1 | 6/2015 |
| WO | 2015/147140 A1 | 10/2015 |

* cited by examiner

WORK SYSTEM, WORK MACHINE, AND CONTROL METHOD

TECHNICAL FIELD

The present invention relates to a work system including a work machine that is remotely operated and a transport vehicle, the work machine, and a control method of the work machine.

Priority is claimed on Japanese Patent Application No. 2017-194605, filed on Oct. 4, 2017, the content of which is incorporated herein by reference.

BACKGROUND ART

Patent Document 1 discloses a technique of changing an operation control of a vehicle as a control target from a normal control to a safety control in a case where reception of a control signal is delayed due to deterioration of a communication state between a remote operation device and the vehicle as a control target.

CITATION LIST

Patent Literature

[Patent Document 1] Japanese Unexamined Patent Application, First Publication No. 2016-71585

DISCLOSURE OF INVENTION

Technical Problem

On the other hand, in a case where a work machine that is remotely operated and a transport vehicle are provided at a work site, it is necessary to control the transport vehicle in consideration of a probability that the work machine is stopped because a fault in communication between the operation device and the work machine occurs.

An aspect of the present invention is to provide a work system, a work machine, and a control method for controlling a transport vehicle in consideration of a fault in communication in a case where the work machine that is remotely operated and the transport vehicle are provided at a work site.

Solution to Problem

According to a first aspect of the present invention, there is provided a work system including an operation device that transmits an operation signal, a work machine that operates on the basis of the operation signal, and a transport vehicle that stops traveling in a case where a fault in communication between the operation device and the work machine occurs.

Advantageous Effects of Invention

According to the aspect, the work system can control the transport vehicle in consideration of a fault in communication in a case where the work machine that is remotely operated and the transport vehicle are provided at a work site.

BEST MODE FOR CARRYING OUT THE INVENTION

First Embodiment

<<Remote Operation System>>

Figure 1:
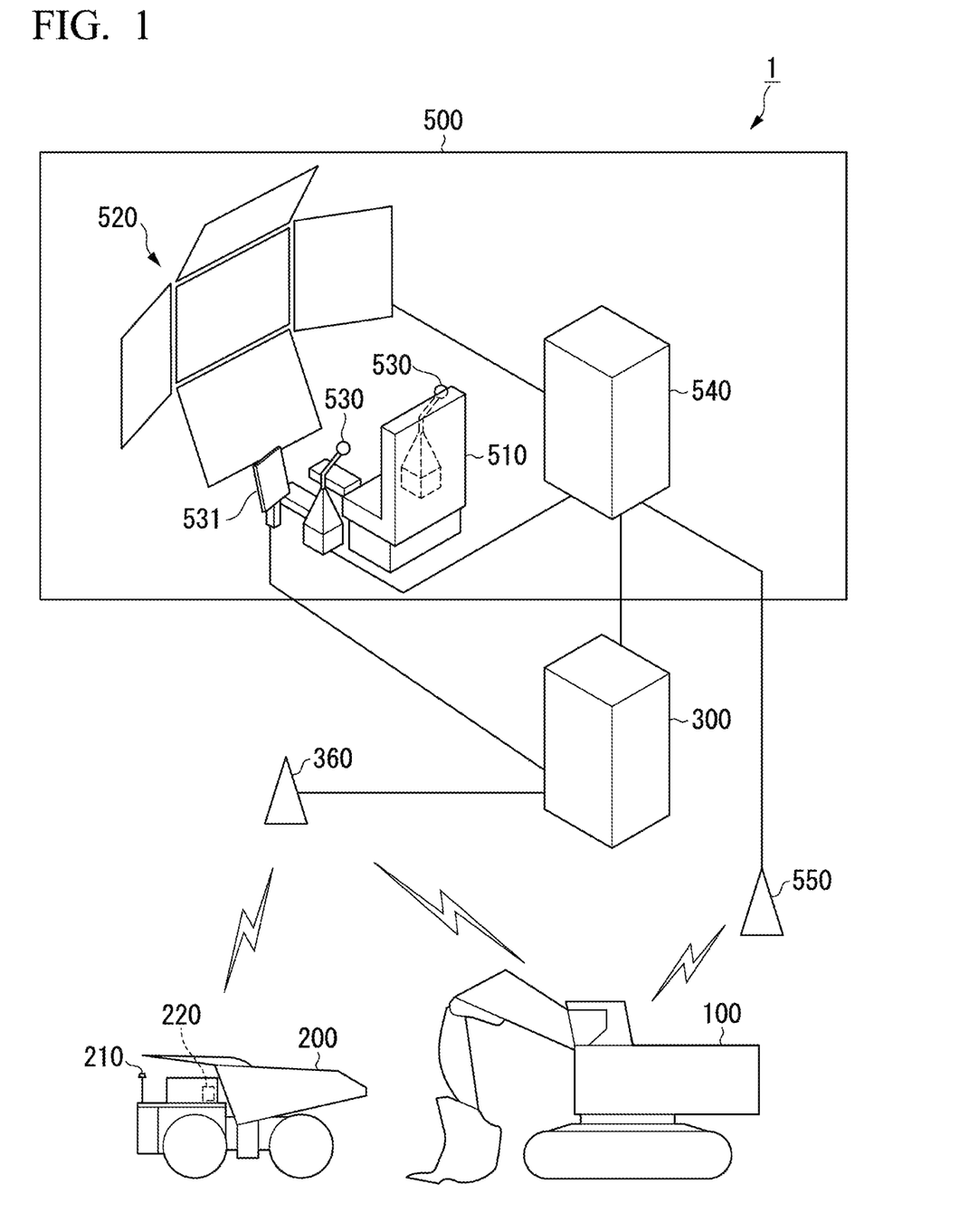
FIG. 1 is a schematic diagram showing a configuration of a remote operation system according to a first embodiment.

FIG. 1 is a schematic diagram showing a configuration of a work system according to a first embodiment.

The work system 1 includes a work machine 100 that is remotely operated, one or more transport vehicles 200, a management apparatus 300, and a remote operation room 500. The work machine 100 and the transport vehicle 200 operate at a work site (for example, a mine, and the like). The remote operation room 500 is provided at a work site or a remote place (for example, a city) away from the work site.

The transport vehicle 200 performs unmanned traveling on the basis of course information received from the management apparatus 300. That is, the transport vehicle 200 according to the first embodiment is an unmanned transport vehicle that travels in an unmanned manner on the basis of the course information which is set. The transport vehicle 200 and the management apparatus 300 are connected to each other by communication via an access point 360. The management apparatus 300 acquires a position and an azimuth direction of the transport vehicle 200 from the transport vehicle 200, and generates course information and a vessel operation signal used for traveling of the transport vehicle 200 on the basis of the position and the azimuth direction of the transport vehicle 200. The management apparatus 300 transmits the course information to the transport vehicle 200. The transport vehicle 200 performs unmanned traveling on the basis of the received course information. That is, the work system 1 includes an unmanned conveyance system including the transport vehicle 200 and the management apparatus 300. The access point 360 is used for communication of the unmanned conveyance system.

The management apparatus 300 receives an instruction signal of the transport vehicle 200 from the work machine 100 and the remote operation room 500, and transmits the instruction signal to the transport vehicle 200. The work machine 100 and the management apparatus 300 are connected to each other by communication via the access point 360. Further, the remote operation room 500 and the management apparatus 300 are connected to each other via a network. Examples of the instruction signal of the transport vehicle 200 received from the work machine 100 and the remote operation room 500 include an entry instruction signal, a start instruction signal, a stop instruction signal, and a stop release signal. The entry instruction signal is a signal for instructing the transport vehicle 200 to enter from a standby point P1 to a loading point P3. The start instruction signal is a signal for instructing the transport vehicle 200 to start from the loading point P3 and leave a loading place A1 when loading is completed. The stop instruction signal is a signal for instructing the transport vehicle 200 to stop. The stop instruction signal is an example of a traveling control instruction signal. The stop release signal is a signal for releasing stop of the transport vehicle 200 by the stop instruction signal.

The work machine 100 is remotely operated on the basis of an operation signal transmitted from the remote operation room 500. The work machine 100 and the remote operation room 500 are connected to each other by communication via an access point 550. In the remote operation room 500, a first operation device 530 receives an operation of the work machine 100 by an operation of an operator, and a control device 540 transmits an operation signal to the work machine 100. The work machine 100 operates on the basis of the operation signal received from the remote operation room 500. That is, the work system 1 includes a remote operation system including the work machine 100 and the remote operation room 500. The access point 550 is used for communication of the remote operation system.

<<Transport Vehicle>>

The transport vehicle 200 according to the first embodiment is an offload dump truck including a vessel. The transport vehicle 200 according to another embodiment may be a transport vehicle other than a dump truck.

The transport vehicle 200 includes a position and azimuth direction detector 210 and a control device 220. The position and azimuth direction detector 210 detects a position and an azimuth direction of the transport vehicle 200. The position and azimuth direction detector 210 includes two receivers that receive positioning signals from satellites of a global navigation satellite system (GNSS). The two receivers are respectively provided at different positions of the transport vehicle 200. As an example of the GNSS, a global positioning system (GPS) may be used. The position and azimuth direction detector 210 detects the position of the transport vehicle 200 in a work site coordinate system on the basis of the positioning signals received by the receivers. The position and azimuth direction detector 210 calculates the direction of the transport vehicle 200, as a relationship between a position of one receiver and a position of the other receiver, using each of the positioning signals received by the two receivers. In another embodiment, the configuration is not limited thereto. For example, the transport vehicle 200 may include an inertial measurement unit (IMU), and may calculate the direction on the basis of a measurement result of the inertial measurement unit. In this case, a drift of the inertial measurement unit may be corrected on the basis of a traveling trajectory of the transport vehicle 200. In the case of calculating the direction using the inertial measurement unit, the transport vehicle 200 may include one receiver.

The control device 220 transmits the position and the azimuth direction detected by the position and azimuth direction detector 210 to the management apparatus 300. The control device 220 receives the course information and the instruction signal from the management apparatus 300. The control device 220 causes the transport vehicle 200 to travel or causes the vessel of the transport vehicle 200 to be raised or lowered on the basis of the received course information and the received instruction signal. Further, when receiving the stop instruction signal from the management apparatus 300, the control device 220 stops traveling of the transport vehicle 200 by outputting a brake signal. The brake signal is an example of the traveling control signal.

<<Work Machine>>

Figure 2:
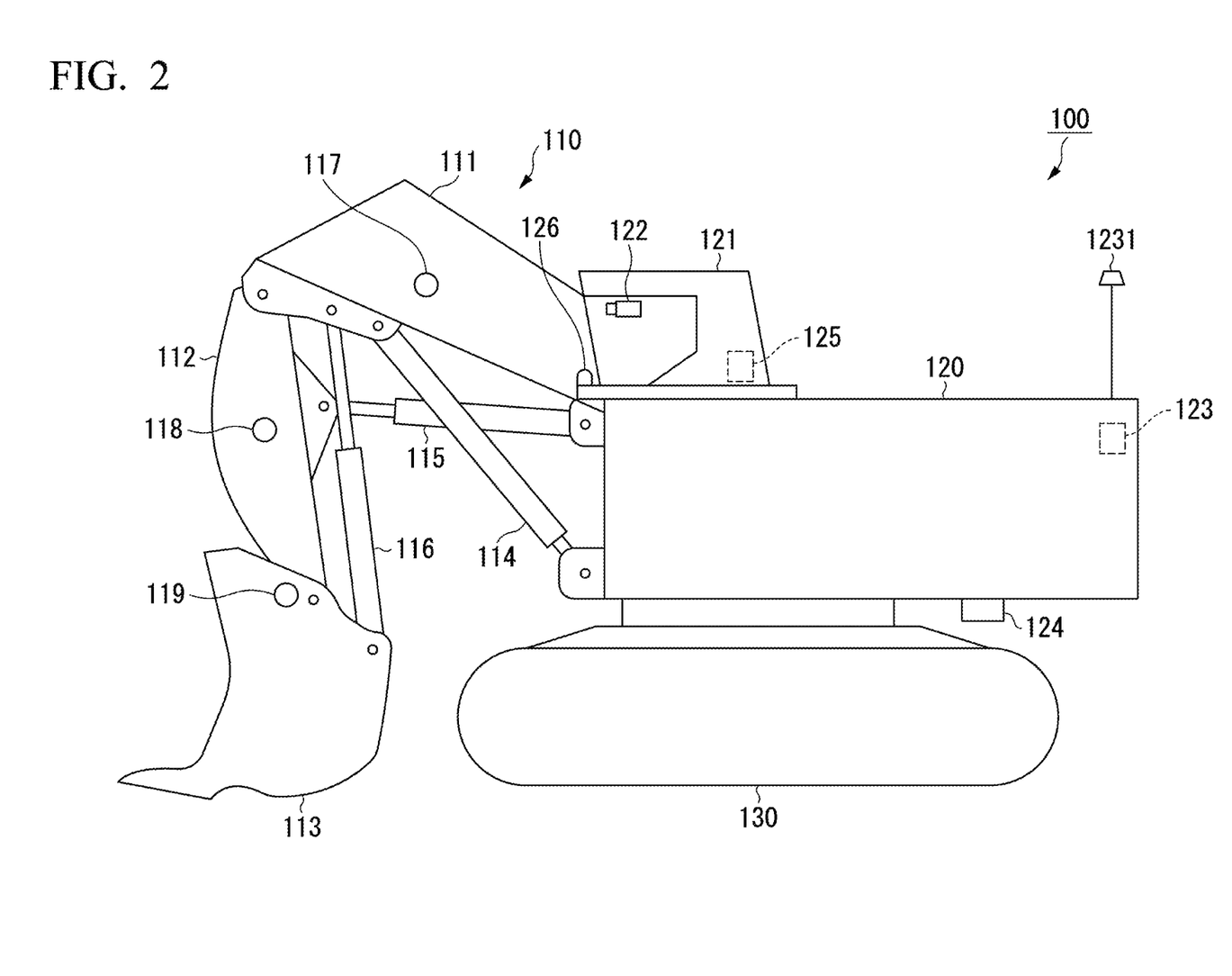
FIG. 2 is an external view of a work machine according to the first embodiment.

FIG. 2 is an external view of the work machine according to the first embodiment.

The work machine 100 according to the first embodiment is a hydraulic shovel that is a type of loading machine. The work machine 100 according to another embodiment may be a work machine other than a hydraulic shovel. Although the work machine 100 shown in FIG. 2 is a face shovel, the work machine 100 may be a backhoe shovel or a rope shovel.

The work machine 100 includes a traveling body 130, a swing body 120 supported by the traveling body 130, and work equipment 110 that is operated by a hydraulic pressure and is supported by the swing body 120. The swing body 120 is supported so as to be swingable around the swing center.

The work equipment 110 includes a boom 111, an arm 112, a bucket 113, a boom cylinder 114, an arm cylinder 115, a bucket cylinder 116, a boom angle sensor 117, an arm angle sensor 118, and a bucket angle sensor 119.

A base end portion of the boom 111 is attached to the swing body 120 via a pin.

The arm 112 connects the boom 111 and the bucket 113. A base end portion of the arm 112 is attached to a front end portion of the boom 111 via a pin.

The bucket 113 includes a blade for excavating earth and sand and a container for containing the excavated earth and sand. A base end portion of the bucket 113 is attached to a front end portion of the arm 112 via a pin.

The boom cylinder 114 is a hydraulic cylinder for operating the boom 111. A base end portion of the boom cylinder 114 is attached to the swing body 120. A front end portion of the boom cylinder 114 is attached to the boom 111.

The arm cylinder 115 is a hydraulic cylinder for driving the arm 112. A base end portion of the arm cylinder 115 is attached to the boom 111. A front end portion of the arm cylinder 115 is attached to the arm 112.

The bucket cylinder 116 is a hydraulic cylinder for driving the bucket 113. A base end portion of the bucket cylinder 116 is attached to the boom 111. A front end portion of the bucket cylinder 116 is attached to the bucket 113.

The boom angle sensor 117 is attached to the boom 111, and detects a tilt angle of the boom 111.

The arm angle sensor 118 is attached to the arm 112, and detects a tilt angle of the arm 112.

The bucket angle sensor 119 is attached to the bucket 113, and detects a tilt angle of the bucket 113.

Each of the boom angle sensor 117, the arm angle sensor 118, and the bucket angle sensor 119 according to the first embodiment detects a tilt angle with respect to a ground plane. The angle sensors according to another embodiment are not limited thereto, and may respectively detect tilt angles with respect to another reference plane. For example, in another embodiment, the angle sensors may respectively detect relative rotation angles by potentiometers provided at the base end portions of the boom 111, the arm 112 and the bucket 113, or may respectively detect tilt angles by measuring cylinder lengths of the boom cylinder 114, the arm cylinder 115, and the bucket cylinder 116 and converting the cylinder lengths into tilt angles.

An operation room 121 is provided on the swing body 120. An imaging device 122 is provided at an upper portion of the operation room 121. The imaging device 122 is provided at a forward and upward portion in the operation room 121. The imaging device 122 captures an image in front of the operation room 121 via a windshield at a front surface of the operation room 121. Examples of the imaging device 122 include, for example, an imaging device using a charge coupled device (CCD) sensor or a complementary metal oxide semiconductor (CMOS) sensor. In another embodiment, the imaging device 122 may not necessarily be provided in the operation room 121, and the imaging device 122 may be provided at a position at which at least a work target range and the work equipment 110 may be imaged.

The work machine 100 includes the imaging device 122, a position and azimuth direction calculator 123, a tilt measurement device 124, and a control device 125.

The position and azimuth direction calculator 123 calculates a position of the swing body 120 and a direction of the swing body 120. The position and azimuth direction calculator 123 includes two receivers 1231 that receive positioning signals from satellites of the GNSS. The two receivers 1231 are respectively provided at different positions of the swing body 120. The position and azimuth direction calculator 123 detects a position of a representative point of the swing body 120 in a work site coordinate system (the origin of a vehicle-body coordinate system) on the basis of the positioning signals received by the receivers 1231.

The position and azimuth direction calculator 123 calculates the direction of the swing body 120, as a relationship between a position of one receiver 1231 and a position of the other receiver 1231, using each of the positioning signals received by the two receivers 1231. The position and the azimuth direction of the work machine 100 can be specified by the position and the azimuth direction of the swing body 120.

The tilt measurement device 124 measures acceleration and angular velocity of the swing body 120, and detects a posture (for example, a roll angle, a pitch angle, and a yaw angle) of the swing body 120 on the basis of the measurement result. The tilt measurement device 124 is provided, for example, on a lower surface of the swing body 120. As the tilt measurement device 124, for example, an inertial measurement unit (IMU) may be used.

The control device 125 drives the work equipment 110, the swing body 120, and the traveling body 130 on the basis of the operation signal received from the remote operation room 500.

Figure 3:
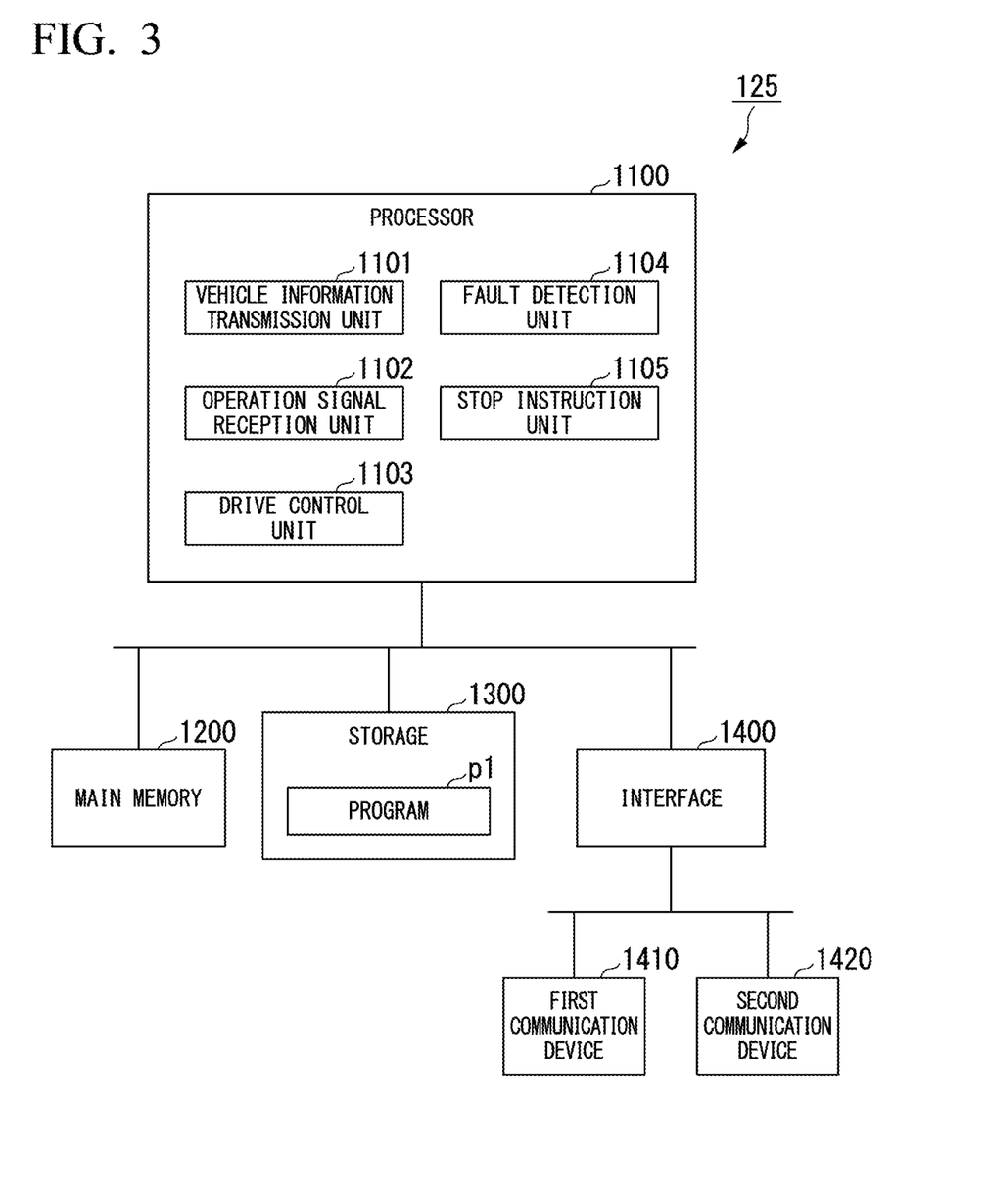
FIG. 3 is a schematic block diagram showing a configuration of a control device of the work machine according to the first embodiment.

FIG. 3 is a schematic block diagram showing a configuration of the control device of the work machine according to the first embodiment.

The control device 125 is a computer including a processor 1100, a main memory 1200, a storage 1300, an interface 1400, a first communication device 1410, and a second communication device 1420. The storage 1300 stores a program p1. The processor 1100 reads the program p1 from the storage 1300, develops the program p in the main memory 1200, and executes processing according to the program p1. The interface 1400, the first communication device 1410, and the second communication device 1420 are connected to each other via a network such as a controller area network (CAN) or Ethernet (registered trademark). The first communication device 1410 is used for communication of the remote operation system, and is wirelessly connected to the remote operation room 500 via the access point 550. A communication line passing through the first communication device 1410 and the access point 550 is an example of a first communication line. The second communication device 1420 is used for communication of the unmanned conveyance system, and is wirelessly connected to the management apparatus 300 via the access point 360. A communication line passing through the second communication device 1420 and the access point 360 is an example of a second communication line.

The processor 1100 includes a vehicle information transmission unit 1101, an operation signal reception unit 1102, a drive control unit 1103, a fault detection unit 1104, and a stop instruction unit 1105 by an execution of the program p1.

The vehicle information transmission unit 1101 transmits the image captured by the imaging device 122, the swing speed, the position, and the direction of the swing body 120, the tilt angles of the boom 111, the arm 112, and the bucket 113, the traveling speed of the traveling body 130, and the posture of the swing body 120, to the remote operation room 500, via the first communication device 1410. Hereinafter, the image, the swing speed, the position, and the direction of the swing body 120, the tilt angles of the boom 111, the arm 112, and the bucket 113, the traveling speed of the traveling body 130, and the posture of the swing body 120 are also referred to as vehicle information. The vehicle information according to another embodiment is not limited thereto. For example, the vehicle information according to another embodiment may not include any of the swing speed, the position, the direction, the tilt angle, the traveling speed, and the posture, may include a value detected by another sensor, and may include a value calculated from the detected value.

The operation signal reception unit 1102 receives an operation signal from the remote operation room 500 via the first communication device 1410.

The drive control unit 1103 drives the work equipment 110, the swing body 120, and the traveling body 130 on the basis of the operation signal received by the operation signal reception unit 1102.

The fault detection unit 1104 detects a fault in communication via the first communication device 1410 by monitoring a reception interval of the operation signals received by the operation signal reception unit 1102. Since the operation signals are transmitted from the remote operation room 500 at regular intervals, the reception interval of the operation signals becomes substantially constant in a case where there is no fault in communication.

The stop instruction unit 1105 transmits a stop instruction signal for stopping the transport vehicle 200 to the management apparatus 300 via the second communication device 1420 in a case where the fault detection unit 1104 detects a fault in communication. The stop instruction unit 1105 is an example of a traveling control instruction unit.

<<Management Apparatus>>

Figure 4:
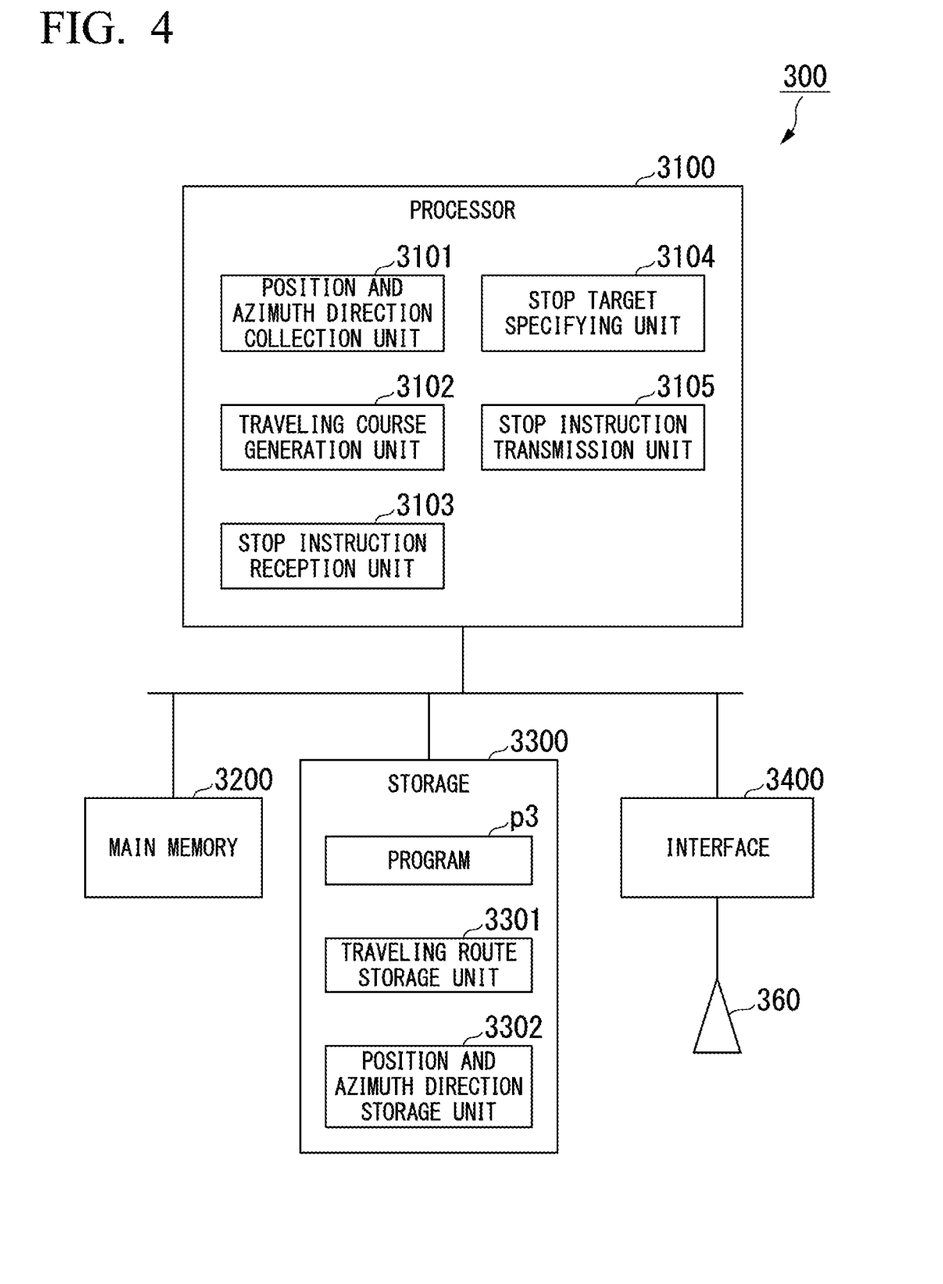
FIG. 4 is a schematic block diagram showing a configuration of a management apparatus according to the first embodiment.

FIG. 4 is a schematic block diagram showing a configuration of the management apparatus according to the first embodiment.

The management apparatus 300 manages traveling of the transport vehicle 200. The management apparatus 300 is a computer including a processor 3100, a main memory 3200, a storage 3300, and an interface 3400. The storage 3300 stores a program p3. The processor 3100 reads the program p3 from the storage 3300, develops the program p3 in the main memory 3200, and executes processing according to the program p3. The management apparatus 300 is connected to the network via the interface 3400. The access point 360 is connected to the interface 3400. The management apparatus 300 is wirelessly connected to the work machine 100 and the transport vehicle 200 via the access point 360.

The storage 3300 includes storage areas as a traveling route storage unit 3301 and a position and azimuth direction storage unit 3302. Examples of the storage 3300 include an HDD, an SSD, a magnetic disk, a magneto-optical disk, a CD-ROM, a DVD-ROM, a semiconductor memory, and the like. The storage 3300 may be an internal medium directly connected to a common communication line of the management apparatus 300, or may be an external medium connected to the management apparatus 300 via the interface 3400. The storage 3300 is a non-temporary tangible storage medium.

The traveling route storage unit 3301 stores a traveling route R for each transport vehicle 200.

Figure 5:
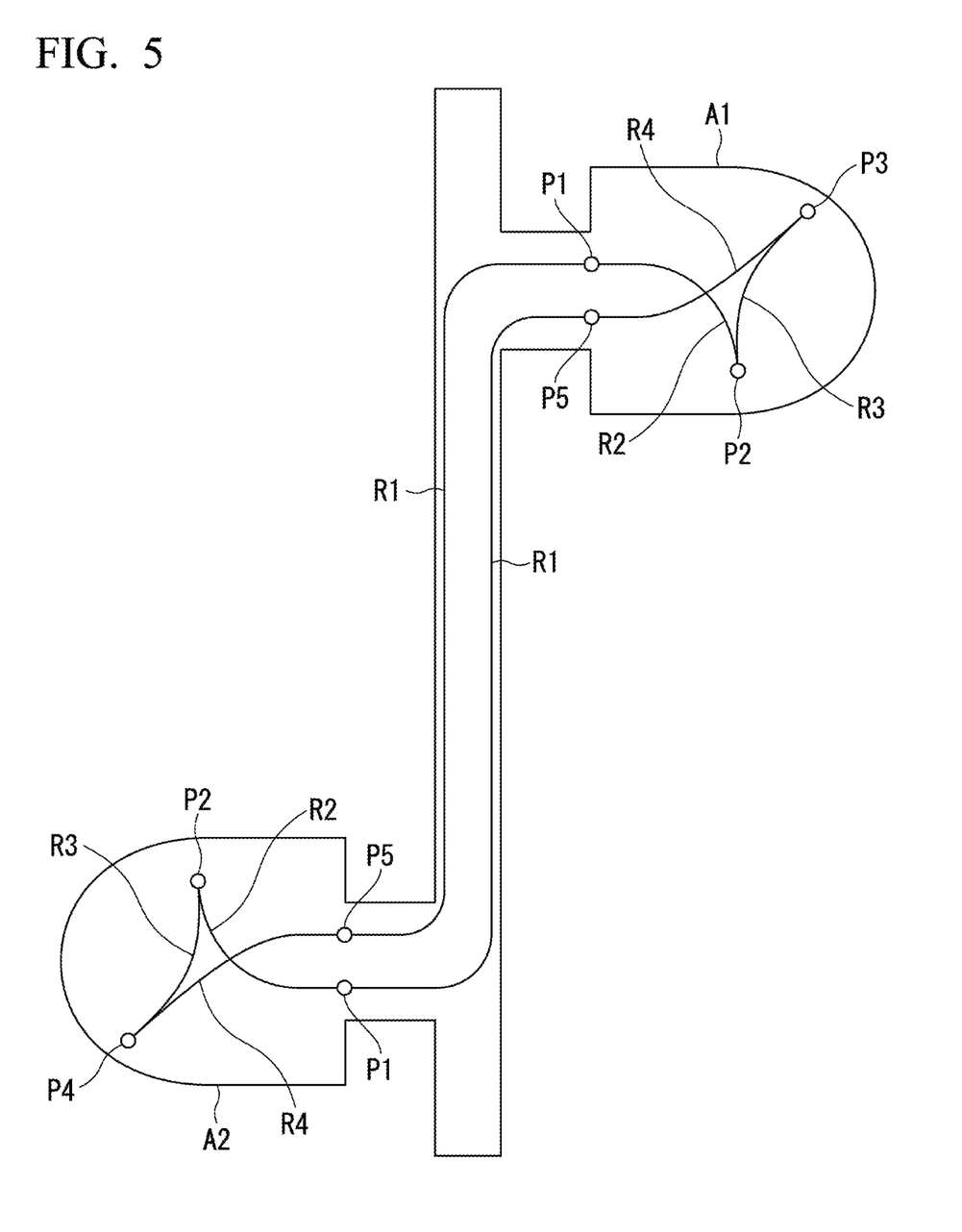
FIG. 5 is a diagram showing an example of a traveling route.

FIG. 5 is a diagram showing an example of a traveling route. The traveling route R includes a predetermined connection route R1 connecting two areas A (for example, a loading place A1 and an earth removal place A2), an entry route R2, an approach route R3, and an exit route R4 which are routes in the area A. The entry route R2 is a route connecting a standby point P1 as one end of the connection route R1 and a predetermined turning point P2 in the area A. The approach route R3 is a route connecting the turning point P2 and a loading point P3 or an earth removal point P4 in the area A. The exit route R4 is a route connecting the loading point P3 or the earth removal point P4 and an exit point P5 as the other end of the connection route R1 in the area A. The loading point P3 is a point which is set by an operation of the operator of the work machine 100. The turning point P2 is a point which is set by the management apparatus 300 according to the position of the loading point P3.

The position and azimuth direction storage unit 3302 stores position information and direction information of each transport vehicle 200.

The processor 3100 includes a position and azimuth direction collection unit 3101, a traveling course generation unit 3102, a stop instruction reception unit 3103, a stop target specifying unit 3104, and a stop instruction transmission unit 3105 by an execution of the program p3.

The position and azimuth direction collection unit 3101 receives position information and direction information of the transport vehicle 200 from the transport vehicle 200 via the access point 360. The position and azimuth direction collection unit 3101 causes the position and azimuth direction storage unit 3302 to store the received position information and the received direction information.

The traveling course generation unit 3102 generates course information including information of an area in which movement of the transport vehicle 200 is permitted, on the basis of the traveling route stored in the traveling route storage unit 3301 and the position information and the direction information stored in the position and azimuth direction storage unit 3302. The generated course information is transmitted to the transport vehicle 200. The course information includes position information of points which are set at predetermined intervals on the traveling route, target speed information at the points, and information of a traveling permission area that does not overlap with traveling permission areas of the other transport vehicles 200.

The stop instruction reception unit 3103 receives a stop instruction signal from the work machine 100 via the access point 550.

The stop target specifying unit 3104 specifies the transport vehicle 200 as a stop target on the basis of the stop instruction signal. The stop target specifying unit 3104 specifies, as the stop target, the transport vehicle 200 existing in the same loading place A1 as the work machine 100 that is a transmission source of the stop instruction signal and traveling on the entry route R2 or the approach route R3. That is, the stop target specifying unit 3104 sets the transport vehicle 200 approaching the work machine 100 in the loading place A1, as the stop target.

The stop instruction transmission unit 3105 transmits a stop instruction signal to the transport vehicle 200 specified by the stop target specifying unit 3104 via the access point 360.

<<Remote Operation Room>>

The remote operation room 500 includes a driver's seat 510, a display device 520, a first operation device 530, a second operation device 531, and a control device 540.

The display device 520 is disposed in front of the driver's seat 510. The display device 520 is disposed in front of the operator's eyes when the operator sits on the driver's seat 510. The display device 520 may be configured with a plurality of displays arranged side by side as shown in FIG. 1, or may be configured with one large display. Further, the display device 520 may a device that projects an image on a curved surface or a spherical surface by a projector or the like.

The first operation device 530 is an operation device for the remote operation system. The first operation device 530 generates an operation signal of the boom cylinder 114, an operation signal of the arm cylinder 115, an operation signal of the bucket cylinder 116, an operation signal for left swing or right swing of the swing body 120, or an operation signal for forward traveling or backward traveling of the traveling body 130 according to an operation of the operator, and outputs the generated signal to the control device 540. The first operation device 530 is configured with, for example, a lever, a knob switch, and a pedal.

The second operation device 531 is an operation device for the unmanned conveyance system. The second operation device 531 generates an entry instruction signal, a start instruction signal, a stop instruction signal, or a stop release signal according to an operation of the operator, and transmits the generated signal to the management apparatus 300. The second operation device 531 is configured with, for example, a touch panel.

The first operation device 530 and the second operation device 531 are disposed in the vicinity of the driver's seat 510. The first operation device 530 and the second operation device 531 are located within an operable range of the operator when the operator sits on the driver's seat 510.

The control device 540 causes the display device 520 to display the image received from the work machine 100. In addition, the control device 540 causes the display device 520 to display the vehicle information received from the work machine 100. At this time, the control device 540 may calculate a delay time of communication with the work machine 100, and cause the display device 520 to display the delay time. The control device 540 may calculate the delay time on the basis of, for example, a reception interval of the images received from the work machine 100. The operator can determine whether or not a fault in communication is eliminated, for example, by visually recognizing the delay time of the communication displayed on the display device 520, and instruct transmission of the stop release signal by operating the second operation device 531 on the basis of the determination.

Further, the control device 540 transmits an operation signal indicating an operation of the first operation device 530, to the work machine 100. The control device 540 periodically transmits an operation signal regardless of the presence or absence of an operation of the first operation device 530. That is, in a case where the first operation device 530 is not operated, the control device 540 transmits an operation signal indicating neutral.

<<Method>>

Figure 6:
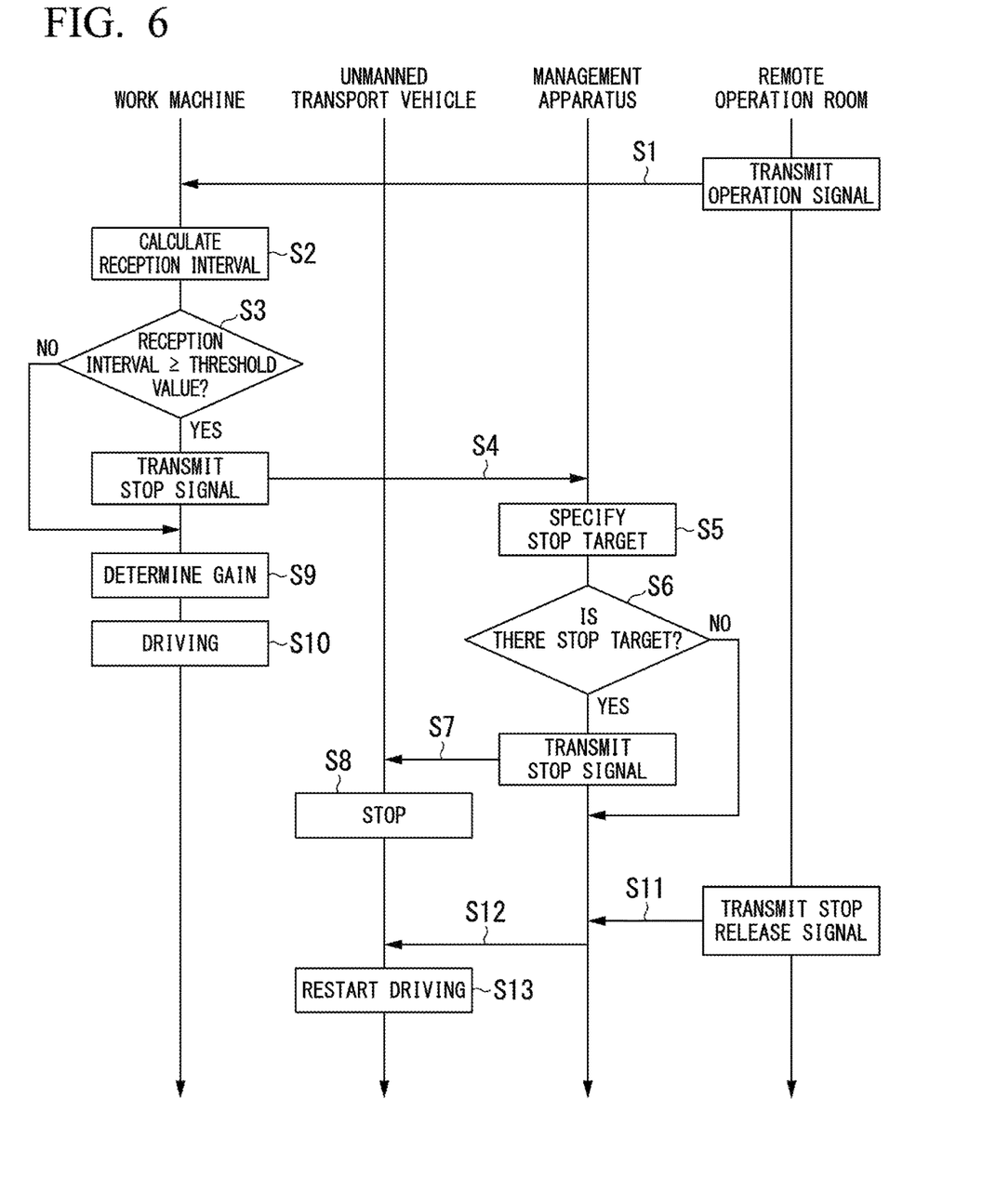
FIG. 6 is a sequence diagram showing an operation of a work system according to the first embodiment.

FIG. 6 is a sequence diagram showing an operation of the work system according to the first embodiment.

The control device 540 of the remote operation room 500 transmits an operation signal to the work machine 100 at regular intervals via the access point 550 (step S1).

When the operation signal reception unit 1102 of the work machine 100 receives the operation signal from the remote operation room 500, the fault detection unit 1104 calculates a difference between a reception time of the previous operation signal and the current time, as the reception interval of the operation signal (step S2). The fault detection unit 1104 determines whether or not the calculated reception interval is equal to or more than a predetermined threshold value (for example, one second) (step S3).

In a case where the fault detection unit 1104 determines that the calculated reception interval is equal to or more than the predetermined threshold value (YES in step S3), the stop instruction unit 1105 transmits a stop signal to the management apparatus 300 via the access point 360 (step S4).

When the stop signal is received from the work machine 100, the stop target specifying unit 3104 of the management apparatus 300 specifies the transport vehicle 200 as a stop target on the basis of the stop instruction signal (step S5). Specifically, the stop target specifying unit 3104 reads the position information of the work machine 100 and the position information of the transport vehicle 200 from the position and azimuth direction storage unit 3302, and specifies the transport vehicle 200 existing in the same loading place A1 as the work machine 100 that is a transmission source of the stop instruction signal. The stop target specifying unit 3104 reads the traveling route of the specified transport vehicle 200 from the traveling route storage unit 3301, and specifies the transport vehicle 200 traveling on the entry route R2 or the approach route R3, as a stop target. The stop target specifying unit 3104 determines whether or not the transport vehicle 200 as a stop target exists (step S6).

In a case where the transport vehicle 200 as a stop target exists (YES in step S6), the stop instruction transmission unit 3105 transmits a stop instruction signal to the transport vehicle 200 specified by the stop target specifying unit 3104 via the access point 360 (step S7). When receiving the stop instruction signal, the control device 220 of the transport vehicle 200 outputs a brake signal and stops the transport vehicle 200 until a stop release signal is received (step S8). The control device 220 causes the transport vehicle 200 not to travel even when course information is received from the management apparatus 300 during a period from reception of the stop instruction signal to reception of a stop release signal.

In a case where the transport vehicle 200 as a stop target does not exist (NO in step S6), the stop instruction transmission unit 3105 does not transmit a stop signal.

In a case where a stop signal is transmitted in step S4 or the reception interval is less than the predetermined threshold value (NO in step S3), the drive control unit 1103 of the work machine 100 determines a gain of a drive amount on the basis of the reception interval (step S9). The gain of the drive amount is a value of 0 or more and 1 or less, and becomes smaller as the reception interval becomes longer. In a case where the reception interval is equal to or less than a first threshold value (for example, 0.5 seconds), the gain of the drive amount is 1. In a case where the reception interval is equal to or more than a second threshold value (for example, one second), the gain of the drive amount is 0. In a case where the reception interval is more than the first threshold value and is less than the second threshold value, the gain of the drive amount monotonously decreases with respect to the reception interval.

The drive control unit 1103 drives the work equipment 110, the swing body 120, and the traveling body 130 on the basis of an operation amount obtained by multiplying an operation amount indicated by the received operation signal by the gain (step S10).

In addition, when the operator instructs transmission of a stop release signal by operating the second operation device 531 of the remote operation room 500, the second operation device 531 transmits a stop release signal to the management apparatus 300 (step S11). The management apparatus 300 transmits the stop release signal received from the remote operation room 500, to the transport vehicle 200 (step S12). When receiving the stop release signal, the control device 220 of the transport vehicle 200 restarts to drive the transport vehicle 200 (step S13). That is, the control device 220 of the transport vehicle 200 causes the transport vehicle 200 to travel on the basis of the course information received from the management apparatus 300 after the stop release signal is received. In the first embodiment, in step S11, the operator determines that a fault is eliminated and instructs transmission of the stop release signal; however, the present invention is not limited thereto. For example, the control device 540 may determine whether or not a fault in communication is eliminated by comparing the delay time of communication with a predetermined set time shorter than a delay time when determining a fault, and automatically transmit a stop release signal.

<<Operation and Effect>>

According to the first embodiment, the transport vehicle 200 stops traveling in a case where a fault in communication between the first operation device 530 and the work machine 100. Accordingly, the work system 1 can control the transport vehicle 200 such that the work machine 100 and the transport vehicle 200 do not contact with each other.

Further, according to the first embodiment, the control device 125 of the work machine 100 drives the work machine 100 on the basis of a value obtained by multiplying the operation amount indicated by the operation signal by the gain which decreases as the delay time increases. Accordingly, even in a case where the operation signal from the first operation device 530 is received with a delay, the work machine 100 reduces the speeds of the work equipment 110, the swing body 120, and the traveling body 130, and thereby allowing the operator to operate the work machine 100.

Further, according to the first embodiment, the control device 125 receives the operation signal transmitted from the first operation device 530 via the access point 550, and transmits the stop signal via the access point 360. That is, different communication lines are used for transmission of the operation signal and transmission of the stop signal. Accordingly, even in a case where the operation signal is not transmitted due to a fault in the communication lines, the control device 125 can transmit the stop signal using the communication line on which a fault may not occur.

Further, according to the first embodiment, the stop signal is transmitted to the transport vehicle 200, which exists in the same loading place A1 as the work machine 100 on which a fault in communication occurs and approaches the work machine 100. On the other hand, the stop signal is not transmitted to the transport vehicle 200 that does not exist in the same loading place A1 as the work machine 100 on which a fault in communication occurs, and to the transport vehicle 200 existing in the same loading place A1 as the work machine 100 and away from the work machine 100.

Accordingly, in a case where a fault in communication occurs, the work system 1 can selectively stop the transport vehicle 200 having a probability of contact while continuing traveling of the transport vehicle 200 having no probability of contact. In another embodiment, the work system 1 may stop or decelerate the transport vehicle 200 existing in the same loading place A1 as the work machine 100 regardless of whether or not the transport vehicle 200 approaches the work machine 100 on which a fault in communication occurs. Alternatively, the work system 1 may stop or decelerate all traveling transport vehicles 200 regardless of whether or not the transport vehicles 200 exist in the loading place A1.

Other Embodiments

As described above, although an embodiment has been described in detail with reference to the drawings, a specific configuration is not limited to the embodiment, and various design changes may be made.

For example, in the work system 1 according to the embodiment, although the control device 125 of the work machine 100 detects a fault in communication, the present invention is not limited thereto. For example, in the work system 1 according to another embodiment, the management apparatus 300 or the control device 540 of the remote operation room 500 may detect a fault in communication. That is, the fault detection unit 1104 and the stop instruction unit 1105 may be provided in the management apparatus 300 or the control device 540. For example, the control device 540 may periodically transmit a confirmation signal for detecting a fault in communication to the work machine 100, and detect a fault on the basis of the presence or absence of a response from the work machine 100. In this case, the control device 540 of the remote operation room 500 outputs a stop signal to the management apparatus 300.

Further, in the embodiment, although the control device 125 determines the presence or absence of a fault in communication on the basis of the reception interval of the operation signals, the present invention is not limited thereto. For example, in the work system 1 according to another embodiment, the control device 125 may determine the presence or absence of a fault in communication on the basis of an error detection rate of received data, the number of times of retransmission of data, the number of times of loss of data, or the like. In addition, for example, in the work system 1 according to another embodiment, the control device 540 of the remote operation room 500 may return data transmitted by the control device 125 of the work machine 100, and the control device 125 may determine the presence or absence of a fault in communication on the basis of a difference between a transmission time and a reception time of the data.

Further, in the embodiment, although the transport vehicle 200, which exists in the same loading place A1 as the work machine 100 that is a transmission source of the stop instruction signal and travels on the entry route R2 or the approach route R3, is specified as a stop target, the present invention is not limited thereto. For example, in another embodiment, in a case where the work machine 100 on which a fault in communication occurs exists on the traveling route R, the transport vehicle 200 traveling on the traveling route R may be specified as a stop target. That is, the transport vehicle 200 stops traveling in a case where a fault in communication between the first operation device 530 and the work machine 100 occurs and the work machine 100 is positioned on the traveling route R of the transport vehicle 200. For example, the management apparatus 300 may specify an area in which the work machine 100 exists by specifying an area in which the swing body 120 of the work machine 100 exists on the basis of the position and the azimuth direction of the work machine 100 and specifying an extension distance of the work equipment 110 on the basis of the tilt angles of the boom 111, the arm 112, and the bucket 113. The management apparatus 300 may determine whether or not the work machine 100 exists on the traveling route R by detecting an overlap between the area in which the work machine 100 exists and the traveling route R. In this case, when a fault in communication occurs, the work system 1 can selectively stop the transport vehicle 200 having a probability of contact while continuing traveling of the transport vehicle 200 having no probability of contact. In addition, in another embodiment, all the transport vehicles 200 may be a stop target.

Further, in the embodiment, although the work machine 100 transmits a stop instruction signal to the transport vehicle 200 via the management apparatus 300, the present invention is not limited thereto. For example, the work machine 100 according to another embodiment may transmit a stop instruction signal to the transport vehicle 200 by inter-vehicle communication. In this case, inter-vehicle communication between the work machine 100 and the transport vehicle 200 is an example of the second communication line. Further, in the embodiment, although the second operation device 531 transmits a stop release signal to the transport vehicle 200 via the management apparatus 300, the present invention is not limited thereto. For example, the second operation device 531 according to another embodiment may be connected to the access point 360, and transmit a stop release signal to the transport vehicle 200 via the access point 360.

Further, in the embodiment, the control device 540 transmits a stop instruction signal to the transport vehicle 200, and the transport vehicle 200 outputs a brake signal on the basis of the stop instruction signal. That is, in the embodiment, the control device 540 outputs the stop instruction signal as a traveling control instruction signal, and the transport vehicle 200 outputs the brake signal as a traveling control signal. On the other hand, in another embodiment, the present invention is not limited thereto. For example, the control device 540 according to another embodiment may output a deceleration instruction signal as a traveling control instruction signal, and the transport vehicle 200 may output a deceleration signal as a traveling control signal. That is, the transport vehicle 200 may not necessarily stop on the basis of the traveling control instruction signal.

Further, according to the embodiment, although the control device 125 determines the gain of the drive amount on the basis of the reception interval of the operation signals, the present invention is not limited thereto. For example, the control device 125 according to another embodiment may not adjust the gain of the drive amount.

Further, in the embodiment, although the transport vehicle 200 is an unmanned transport vehicle, the present invention is not limited thereto. For example, the transport vehicle 200 according to another embodiment may be a manned transport vehicle. In this case, the control device 220 of the transport vehicle 200 may stop the transport vehicle 200 by outputting a brake signal on the basis of the stop instruction signal received from the management apparatus 300 regardless of an operation of the operator, or may prompt the operator to stop the transport vehicle 200 by outputting an alarm signal on the basis of the stop instruction signal. When the control device 220 outputs an alarm signal, a speaker (not shown) provided on the transport vehicle 200 outputs a warning sound, or a monitor (not shown) displays warning information. The alarm signal is an example of a traveling control signal.

In the work system 1 according to the embodiment, the work machine 100 loads earth and sand; however, in another embodiment, the present invention is not limited thereto. For example, an object to be loaded according to another embodiment may be ore, crushed stone, coal, or the like.

In the control device 125 according to the embodiment, although a case where the program P1 is stored in the storage 1300 has been described, the present invention is not limited thereto. For example, in another embodiment, the program p1 may be distributed to the control device 125 by a communication line. In this case, when the distributed program p1 is received, the control device 125 develops the program p1 in the main memory 1200, and executes the processing according to the program p1.

Further, the program p1 may be a program for realizing some of the above-described functions. For example, the program p may be a program for realizing the above-described functions in combination with another program p1 already stored in the storage 5300 or another program p1 embedded in another device.

Further, the control device 125, the management apparatus 300, and the control device 540 may include a programmable logic device (PLD) in addition to or instead of the configuration. Examples of PLD include a programmable array logic (PAL), a generic array logic (GAL), a complex programmable logic device (CPLD), and a field programmable gate array (FPGA). In this case, some of the functions realized by the processor may be realized by PLD.

INDUSTRIAL APPLICABILITY

The work system according to the present invention can control the transport vehicle in consideration of a fault in communication in a case where the work machine that is remotely operated and the transport vehicle are provided at a work site.

REFERENCE SIGNS LIST

1: Work System
100: Work Machine
125: Control Device
1101: Vehicle Information Transmission Unit
1102: Operation Signal Reception Unit
1103: Drive Control Unit
1104: Fault Detection Unit
1105: Stop Instruction Unit (Traveling Control Instruction Unit)
1410: First Communication Device
1420: Second Communication Device
200: Transport Vehicle
300: Management Apparatus
360: Access Point
550: Access Point
3101: Position Information Collection Unit
3102: Traveling Course Generation Unit
3103: Transmission Unit
3104: Stop Target Specifying Unit
3105: Stop Instruction Transmission Unit
3301: Traveling Route Storage Unit
3302: Position Information Storage Unit
500: Remote Operation Room
510: Driver's Seat
520: Display Device
530: First Operation Device
531: Second Operation Device
540: Control Device

The invention claimed is:

1. A work system comprising:
a loading machine that includes work equipment including a boom, an arm, and a bucket and operates on the basis of an operation signal operating the work equipment;
an operation device that is provided outside the loading machine and transmits the operation signal;
a transport vehicle that transports a load loaded by the loading machine;
a managing apparatus that specifies the transport vehicle existing in the same loading place as the loading machine and that transmits a traveling control instruction signal to the specified transport vehicle to control traveling of the specified transport vehicle, in a case where a fault in communication between the operation device and the loading machine is detected; and
a control device on the specified transport vehicle that receives the traveling control instruction signal and that controls traveling of the specified transport vehicle,
wherein the managing apparatus includes:
a fault detection unit that detects the fault in communication between the operation device and the loading machine, and
a traveling control instruction unit that transmits the traveling control instruction signal to the transport vehicle in a case where the fault is detected,
wherein the fault detection unit calculates a delay time of the communication,
wherein the traveling control instruction unit transmits the traveling control instruction signal in a case where the delay time exceeds a predetermined time,
wherein the managing apparatus further includes a drive control unit that drives the loading machine on the basis of a value obtained by multiplying an operation amount indicated by the operation signal by a gain in a case where the delay time is within the predetermined time, the gain being decreased as the delay time increases, and
wherein the managing apparatus is provided in the loading machine.

2. The work system according to claim 1,
wherein the operation device transmits the operation signal to the managing apparatus via a first communication line, and
wherein the traveling control instruction unit transmits the traveling control instruction signal via a second communication line different from the first communication line.

3. The work system according to claim 2,
wherein the transport vehicle outputs a traveling control signal in a case where the fault in communication between the operation device and the loading machine occurs and the loading machine is positioned on a traveling route of the transport vehicle.

4. The work system according to claim 2,
wherein the transport vehicle outputs a traveling control signal in a case where the fault in communication between the operation device and the loading machine occurs and the transport vehicle approaches the loading machine in the same loading place as the loading machine.

5. The work system according to claim 1,
wherein the transport vehicle outputs a traveling control signal in a case where the fault in communication between the operation device and the loading machine occurs and the loading machine is positioned on a traveling route of the transport vehicle.

6. The work system according to claim 5,
wherein the transport vehicle outputs a traveling control signal in a case where the fault in communication between the operation device and the loading machine occurs and the transport vehicle approaches the loading machine in the same loading place as the loading machine.

7. The work system according to claim 1,
wherein the transport vehicle outputs a traveling control signal in a case where the fault in communication between the operation device and the loading machine occurs and the transport vehicle approaches the loading machine in the same loading place as the loading machine.

8. The work system according to claim 1,
wherein the specified transport vehicle is a transport vehicle which exists in the same loading place and approaches the loading machine.

9. The work system according to claim 8,
wherein the traveling control instruction signal is not transmitted to a transport vehicle that does not exist in the same loading place as the loading machine.

10. A loading machine including work equipment that includes a boom, an arm, and a bucket and that is for loading a load onto a transport vehicle, the loading machine comprising:
an operation signal reception unit that receives an operation signal from an operation device;
a drive control unit that operates the work equipment on the basis of the operation signal;
a traveling control instruction unit that transmits a traveling control instruction signal for stopping traveling of the transport vehicle in a case where a fault in communication between the operation device and the loading machine occurs, and
a managing apparatus including:
a fault detection unit that detects the fault in communication between the operation device and the loading machine, and
a traveling control instruction unit that transmits the traveling control instruction signal to the transport vehicle in a case where the fault is detected,
wherein the fault detection unit calculates a delay time of the communication,
wherein the traveling control instruction unit transmits the traveling control instruction signal in a case where the delay time exceeds a predetermined time, and
wherein the managing apparatus further includes a drive control unit that drives the loading machine on the basis of a value obtained by multiplying an operation amount indicated by the operation signal by a gain in a case where the delay time is within the predetermined time, the gain being decreased as the delay time increases.

11. A control method comprising the steps of:
transmitting an operation signal operating work equipment to a loading machine by an operation device, the loading machine including the work equipment includes a boom, an arm, and a bucket;
transmitting a traveling control instruction signal to a transport vehicle that transports a load loaded by the loading machine in a case where a fault in communication between the operation device and the loading machine occurs,
detecting the fault in communication between the operation device and the loading machine,
transmitting the traveling control instruction signal to the transport vehicle in a case where the fault is detected,
calculating a delay time of the communication,
transmitting the traveling control instruction signal in a case where the delay time exceeds a predetermined time, and
driving the loading machine on the basis of a value obtained by multiplying an operation amount indicated by the operation signal by a gain in a case where the delay time is within the predetermined time, the gain being decreased as the delay time increases.

* * * * *